United States Patent
Buck

[19]

[11] Patent Number: 6,114,704
[45] Date of Patent: Sep. 5, 2000

[54] FRONT-ILLUMINATED FLUORESCENT SCREEN FOR UV IMAGING

[75] Inventor: Jesse D. Buck, San Marcos, Calif.

[73] Assignee: Cymer, Inc., San Diego, Calif.

[21] Appl. No.: 09/170,669

[22] Filed: Oct. 13, 1998

[51] Int. Cl.[7] .................................................. G01J 1/42
[52] U.S. Cl. ................................. 250/372 R; 250/483.1
[58] Field of Search ........................... 250/372 R, 474.1, 250/473.1, 472.1, 483.1; 372/80

[56] References Cited

U.S. PATENT DOCUMENTS

| | | | |
|---|---|---|---|
| H1547 | 6/1996 | Tsuji ........................................ | 430/531 |
| 3,993,486 | 11/1976 | Oishi ........................................ | 96/29 D |
| 4,297,584 | 10/1981 | Buchanan et al. ...................... | 250/483 |
| 4,341,654 | 7/1982 | Swinehart ......................... | 252/301.4 H |
| 4,422,758 | 12/1983 | Godfrey et al. ...................... | 356/152.1 |
| 4,448,547 | 5/1984 | Wickesheim ........................... | 374/131 |
| 4,804,845 | 2/1989 | Takeuchi ................................ | 250/367 |
| 4,812,660 | 3/1989 | Lindmayer ........................... | 250/484.1 |
| 4,825,084 | 4/1989 | Braunlich et al. ................... | 250/484.1 |
| 4,920,040 | 4/1990 | Ono ....................................... | 430/363 |
| 4,980,559 | 12/1990 | Bryan et al. ........................ | 250/483.1 |
| 5,083,031 | 1/1992 | Hoesler et al. ....................... | 250/484.1 |
| 5,150,394 | 9/1992 | Karellas ..................................... | 378/62 |
| 5,216,531 | 6/1993 | Hirai et al. ............................... | 359/52 |
| 5,371,377 | 12/1994 | Struye et al. ........................... | 250/588 |
| 5,465,284 | 11/1995 | Karellas ..................................... | 378/62 |
| 5,569,530 | 10/1996 | Dooms et al. ....................... | 250/483.1 |
| 5,576,160 | 11/1996 | Goan et al. ............................. | 430/509 |
| 5,606,163 | 2/1997 | Huston et al. .......................... | 250/337 |

*Primary Examiner*—Seungsook Ham
*Assistant Examiner*—Richard Hanig
*Attorney, Agent, or Firm*—Brian D. Ogonowsky, Esq.

[57] ABSTRACT

In one embodiment of the invention, phosphor powder in a binder is deposited on a flat first side of a fused silica substrate. The UV output of a laser beam is reflected off an angled beam splitter so as to be incident upon a flat second side of the fused silica substrate. The phosphor is energized by the UV light transmitted through the fused silica and re-radiates a visible wavelength. The binder is selected to be opaque to UV wavelengths so that only a thin layer (10–20 microns) of the phosphor is energized by the incident UV beam. Since the energized phosphor layer against the first side of the substrate is extremely thin and flat, the energized phosphor produces a visible light which precisely corresponds to the incident UV light. The visible light may then be used to determine the characteristics of the UV beam.

21 Claims, 1 Drawing Sheet

FRONT-ILLUMINATED FLUORESCENT SCREEN FOR UV IMAGING

FIELD OF THE INVENTION

This invention relates to detecting characteristics of an ultra-violet (UV) beam, such as that generated by a laser, using a camera.

BACKGROUND

It is well known to convert an energy beam having a wavelength which is not visible to the human eye to a different wavelength which is within the visible range. This wavelength conversion is frequently accomplished with the use of a fluorescent screen which has incident upon it the non-visible energy beam and re-radiates this energy beam as visible light. Such screens are most commonly used in x-ray systems.

In certain applications of a UV laser, the cross-sectional shape of the laser beam and the light intensity variations across the beam are very significant. One such application is in the field of photolithography when forming integrated circuits on a semiconductor wafer. It is desirable to detect the UV laser beam characteristics for laser diagnostic purposes. The resolution required for detecting these beam characteristics is on the order of tens of microns.

SUMMARY

In one embodiment of the invention, phosphor powder in a binder, such as sodium silicate solution, is deposited on a flat first side of a fused silica substrate. Fused silica is transparent to UV radiation. The UV output of a laser beam is reflected off an angled mirror so as to be incident upon a flat second side of the fused silica substrate opposite the first side. The phosphor is energized by the UV light transmitted by the fused silica and re-radiates a visible wavelength back through the second side. The binder is selected to be opaque to UV wavelengths so that only a thin layer (10–20 microns) of the phosphor against the first side is energized by the incident UV beam. Since the energized phosphor layer against the first side of the substrate is extremely thin (owing to the opaqueness of the binder) and flat (owing to the optical quality surface of the fused silica substrate), the energized phosphor produces a visible light which precisely corresponds to the incident UV light. In the preferred embodiment, a resolution of 10 microns is obtained, dependent on the grain size of the phosphor powder.

A camera, sensitive to visible light, is positioned and focused to view, through the second side, the first side of the fused silica substrate directly through the UV mirror. The image from the camera is then analyzed for controlling the laser as necessary to correct undesired characteristics of the laser beam or for other diagnostic purposes.

DETAILED DESCRIPTION OF THE EMBODIMENTS

Figure 1:
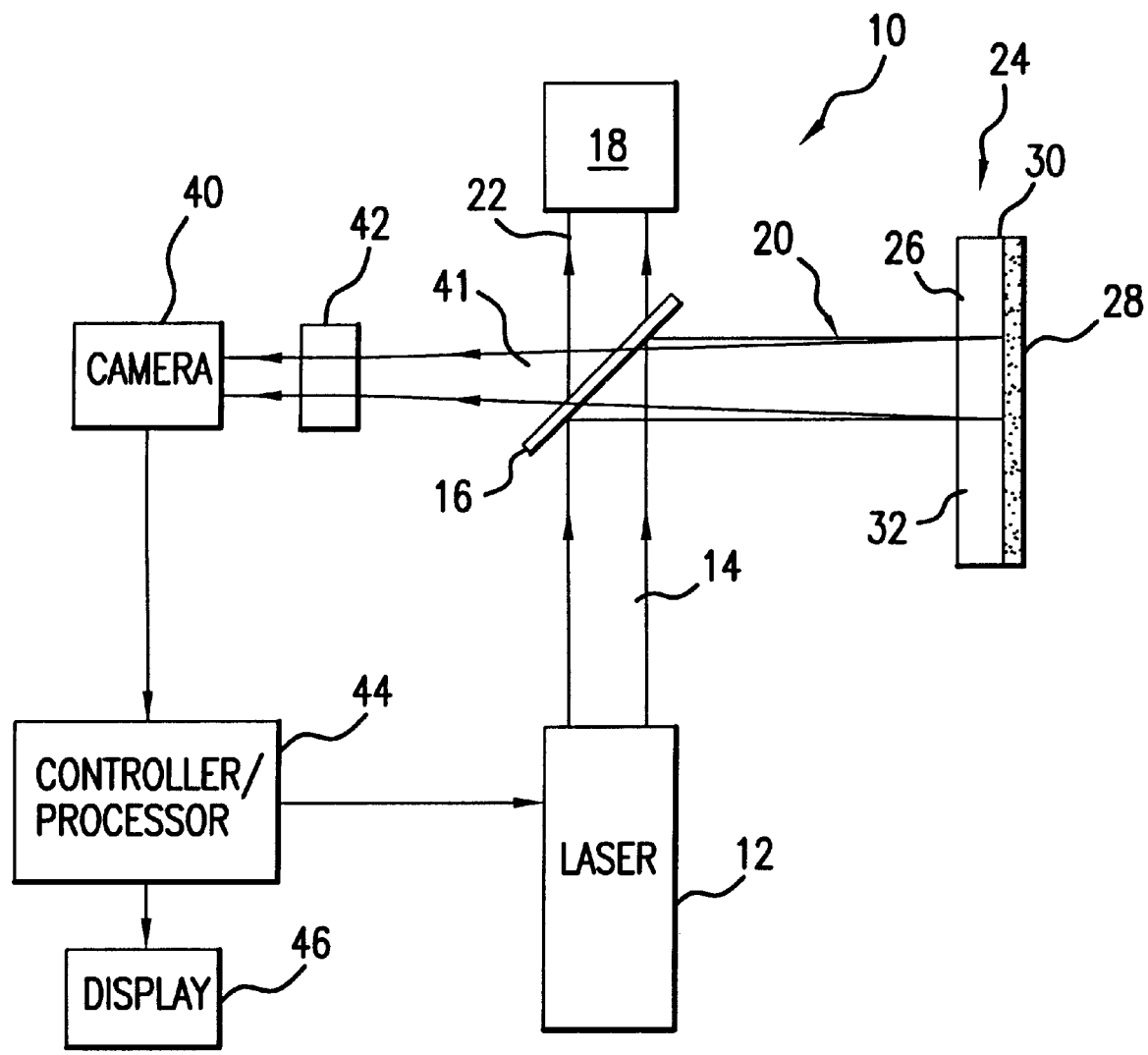
FIG. 1 is a schematic diagram of a laser diagnostic system in accordance with one embodiment of the invention.

FIG. 1 is a schematic diagram of a laser diagnostic and control system 10 for detecting the characteristics of a laser beam and using these characteristics to adjust the laser light output.

A laser 12 outputs a laser beam 14. In one embodiment, the laser beam 14 has a rectangular cross-section of 4 mm×15 mm. Laser 12 may be an excimer laser which outputs a UV beam having a wavelength of approximately 248 nm or 193 nm.

An angled UV splitter 16 receives the incident beam 14 and reflects a small portion of beam 14 to a screen 24. Splitter 16 is transparent to visible light wavelengths, and such mirrors are well known in the art as dichroic mirrors.

In one particular application, a large portion of the laser beam 14 passes through splitter 16 to a set of optics and a reticle in a stepper 18 or scanner for selectively exposing a semiconductor wafer to laser light. The laser light which exposes the wafer surface must be very uniform across the wafer to ensure predictable characteristics of the resulting integrated circuits.

In one embodiment, the intensity of reflected light 20 by splitter 16 is about 1% of the total beam 14 intensity. Accordingly, about 99% of the incident beam 14 is transmitted through splitter 16 and is designated as beam 22.

In one embodiment, screen 24 is composed of a fused silica substrate 26 and a deposited layer 28 of phosphor material. In one embodiment, substrate 26 is approximately ¼ inch thick, and its surfaces are formed to be as flat as practical for a minimum amount of distortion. Such optical quality substrates are known and commercially available. Substrate 26 may be circular or rectilinear.

On one surface 30 of substrate 26 is deposited a phosphor material which is sensitive to the UV wavelength of interest. One commercially available phosphor material converts the UV wavelength to a green color wavelength; however, phosphor materials are commercially available for converting the UV wavelength into other wavelengths.

In one embodiment, this phosphor material is comprised of a phosphor powder in a binder, where the powder has a 10 micron grain size to achieve the desired image resolution of 10 microns. Grains of 5–50 microns can be satisfactorily used. Such a phosphor material is commercially available from United Mineral Supply Company. The phosphor material and the binder are suspended in water so as to be easily painted or sprayed on surface 30 of substrate 26. The mixture is then heated to evaporate the water and solidify the binder. In one embodiment, the resulting layer 28 is 0.5 mm thick, but this thickness is not important since the UV light only penetrates a very small distance into layer 28. In one embodiment, the UV light only enters a distance of 10–20 microns into layer 28. This short penetration minimizes light scattering in layer 28 to avoid blurring the visual image of the beam.

To obtain such a short penetration into layer 28, the binder which is used to hold the phosphor material is chosen to be opaque to the UV radiation so that the UV radiation does not spread out. This binder may be sodium silicate ($NaSiO_3$), which is transparent to visible light. Preferably, the binder is all inorganic so that the UV radiation does not deteriorate the binder. In one embodiment, layer 28 comprises 5% of the binder and 95% of the phosphor material. One suitable mixture is commonly referred to as water glass used for cementing glass.

In another emodiment, the phosphor powder may simply be mechanically compressed against the fused silica surface, in case the effects of the binder are not desired.

Screen 24 is relatively easy and inexpensive to manufacture since the materials are commercially available.

The beam 20 is made incident upon the back surface 32 of substrate 26. By applying the incident beam through the back surface 32 of substrate 26 to layer 28, it is assured that the portion of phosphor material which re-radiates the light will be extremely flat to minimize distortion. Since the portion of layer 28 that is utilized is only the 10–20 micron layer against the flat surface 30, the utilized portion will also be extremely uniform, resulting in very little intensity and shape distortion of the image.

A conventional camera 40, such as a CCD camera, views the visible image 41 through UV splitter 16 and the transparent surface 32 of substrate 26 and converts this image into electrical signals. Splitter 16 is transparent to the wavelength of the light re-radiated by screen 24. A lens 42 may be used to suitably convert the image for application to camera 40, such as by enlarging the image so that characteristics of the beam 20 may be better detected.

Although some cameras may detect UV radiation directly, these cameras have various drawbacks, and UV radiation typically deteriorates the camera's image sensor. The wavelength re-radiated by screen 24 is easily detected and does not deteriorate the camera 40 image sensor.

The output of camera 40 is applied to a controller 44 which analyzes the light intensity across the beam 20, detects the beam shape, or detects other characteristics of the beam 20 to determine whether the beam characteristics are optimal. In some cases, controller 44 then generates correction signals for application to laser 12 to correct the beam as appropriate. Techniques for adjusting a laser output are well known and need not be discussed herein. The processed output of camera 40 may also be displayed by a CRT or printer 46 which provides a readout of the beam characteristics.

For controlling the laser's operating characteristics, all the components of FIG. 1 may be built into the laser as a sub-module or part of a more complex beam measuring sub-module. Such a configuration provides an in-situ measurement capability. The components may also be assembled into a separate module which is easily transported and temporarily attached to the laser. In this case, the configuration is termed a field tool, and laser characteristics would normally be measured only occasionally. Thus, in that case, control of the laser by controller 44 would not be implemented.

Detecting a re-radiated image through the back surface 32 of screen 24 to obtain an accurate image of an incident beam may be applied to other applications to precisely detect characteristics of a non-visible incident light beam.

In another embodiment, UV splitter 16 is not used, and beam 14 is directly made incident on screen 24. In such an embodiment, camera 40 is slightly offset from beam 14 so as to accurately detect the luminescence of the energized phosphor material emanating through surface 32.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A system comprising:
    a light source generating light of a first wavelength not visible to the human eye;
    a screen for converting said light of said first wavelength to light of a second wavelength, said screen comprising a substrate having opposing smooth surfaces, said substrate being transparent to said light of said first wavelength and said second wavelength, said substrate having deposited on a first surface a material which, when energized by said light of said first wavelength, generates light of said second wavelength,
    said light of said first wavelength being applied to a second surface of said substrate opposing said first surface; and
    an optical detector detecting light of said second wavelength being emanated through said second surface.

2. The system of claim 1 wherein said material deposited on said first surface is a phosphor material.

3. The system of claim 2 wherein said material deposited on said first surface is a phosphor material in a binder, said binder being opaque to said light of said first wavelength.

4. The system of claim 1 wherein said substrate is fused silica.

5. The system of claim 1 wherein said light of said first wavelength is ultra-violet light emanating from a laser.

6. The system of claim 5 wherein a beam output from said laser is reflected off a beam splitter and through said second surface of said screen onto said material.

7. The system of claim 6 wherein said detector views said second surface of said substrate through said splitter, said splitter being transparent to said second wavelength.

8. The system of claim 1 wherein said detector outputs a signal corresponding to detected light of said second wavelength generated by said screen, said system further comprising:
    a controller for converting said signal into control signals for adjusting said light source.

9. The system of claim 1 herein said material comprises a phosphor powder having a grain size within a range of approximately 5 microns to 50 microns.

10. The system of claim 1 wherein said light of said first wavelength incident upon said second surface enters said material a maximum depth of approximately 20 microns.

11. The system of claim 1 wherein said material comprises phosphor powder in a binder of sodium silicate.

12. A method comprising:
    generating light of a first wavelength not visible to the human eye;
    providing a screen for converting said light of said first wavelength to light of a second wavelength, said screen comprising a substrate having opposing smooth surfaces, said substrate being transparent to said light of said first wavelength and said second wavelength, said substrate having deposited on a first surface a material which, when energized by said light of said first wavelength, generates light of said second wavelength,
    applying said light of said first wavelength to a second surface of said substrate opposing said first surface; and
    detecting light of said second wavelength emanating through said second surface.

13. The method of claim 12 wherein said material deposited on said first surface is a phosphor material in a binder, said binder being opaque to said light of said first wavelength.

14. The method of claim 12 wherein said substrate is fused silica.

15. The method of claim 12 wherein said light of said first wavelength is ultra-violet light emanating from a laser.

16. The method of claim 15 further comprising reflecting a beam output from said laser off a beam splitter and through said second surface of said screen onto said material.

17. The method of claim 16 wherein said detector views said second surface of said substrate through said splitter, said splitter being transparent to said second wavelength.

18. The method of claim 12 wherein a detector detects said light emanating through said second surface, said method further comprising:
generating a signal by said detector corresponding to detected light of said second wavelength generated by said screen; and
converting said signal into control signal for adjusting said light source.

19. The method of claim 12 herein said material comprises a phosphor powder having a grain size within a range of approximately 5 microns to 50 microns.

20. The method of claim 12 wherein said light of said first wavelength incident upon said second surface enters said material a maximum depth of approximately 20 microns.

21. The method of claim 12 wherein said material comprises phosphor powder in a binder of sodium silicate.

* * * * *